United States Patent [19]

Ishii et al.

[11] Patent Number: 5,198,271
[45] Date of Patent: Mar. 30, 1993

[54] METHOD FOR PRODUCING POLYOLEFIN FOAM SHEET

[75] Inventors: Seiji Ishii; Tokuo Okada; Hiroshi Ohta; Hiroya Fukuda; Takashi Ohashi; Osamu Kondo, Yokohama, all of Japan

[73] Assignee: Bridgestone Corporation, Tokyo, Japan

[21] Appl. No.: 602,682

[22] Filed: Oct. 24, 1990

[30] Foreign Application Priority Data

Nov. 6, 1989 [JP] Japan .................................. 1-288155
Feb. 8, 1990 [JP] Japan .................................... 2-29256

[51] Int. Cl.$^5$ .......................... B05D 3/02; B05D 5/00
[52] U.S. Cl. ...................................... 427/244; 427/373
[58] Field of Search .................. 264/54; 521/79, 84.1; 427/244, 373

[56] References Cited

U.S. PATENT DOCUMENTS 4,663,361  5/1987  Park ................................. 264/53 X

FOREIGN PATENT DOCUMENTS 56-62134  5/1981  Japan .
58-42630  3/1983  Japan .
1502663  3/1978  United Kingdom .
2070033  9/1981  United Kingdom .

Primary Examiner—Evan Lawrence
Attorney, Agent, or Firm—Birch, Stewart, Kolasch & Birch

[57] ABSTRACT

A method for producing a polyolefin foam sheet which includes heating a foamable base sheet comprising a polyolefin resin, a foaming agent, and a resin varnish. The resin of the varnish is selected from the group consisting of rosin, cumarone-indene resin, phenolic resin, alkyd resin, and shellac resin.

5 Claims, 2 Drawing Sheets

METHOD FOR PRODUCING POLYOLEFIN FOAM SHEET

BACKGROUND OF THE INVENTION

1. Field of the Invention

This invention relates to a method for producing a polyolefin foam such as a polyethylene foam or polypropylene foam and a method for improving its thermal resistance and surface wettability.

2. Description of the Prior Art

Polyolefin foam sheets such as polyethylene foam sheets and polypropylene foam sheets have conventionally been utilized for various uses such as vehicle interior materials, housetop heat insulating materials, crating materials and various buoyancy materials.

The polyolefin foam sheet is usually produced by heating a foamable base sheet containing a polyolefin resin and an organic foaming agent which is solid at room temperature and decomposes and generates gas during heating to foam the base sheet. In this case, the polyolefin resin of the base sheet is crosslinked before heating and foaming to give a proper melt viscosity thereto and the gas generated due to decomposition of the foaming agent by heating produces many foams against the viscosity of the polyolefin resin of the base sheet, which results in the foaming of the base sheet thereby producing a polyolefin foam sheet. The base sheet is converted into a polyolefin foam sheet having an expansion ratio in accordance with the amount of the foaming agent contained in the base sheet by properly controlling the heating temperature and the heating time. Use of a long size base sheet results in a long size foam sheet after heating.

However, in the conventional production of polyolefin foam sheets, the permissible ranges of heating temperature and heating time for producing foams having good appearance and physical properties are very narrow and good foam sheets can be obtained only within narrow temperature and time ranges. Therefore, in producing a foam sheet by heating a base sheet containing a polyolefin resin and a foaming agent according to the conventional method, the thickness of the base sheet should be made accurate and the heating temperature and the heating time should be precisely controlled in order to obtain a polyolefin foam sheet having a desired thickness and desired physical properties. Variations of heating temperature and time may result in foam melting, non-foaming, inferior appearance of the resulting foam sheet such as its total width variation, and reduced physical properties of the foam sheet. Therefore, the conventional method for producing polyolefin foam sheets has many problems on foaming process.

Conventional polyolefin foams are not sufficiently satisfactory in terms of their thermal resistance. For instance, the conventional polyolefin foam may be melted to deform easily at high temperature.

In addition, conventional polyolefin foams have inferior surface wettability. When such a conventional polyolefin foam is laminated with an outer layer such as a vinyl chloride sheet in a later process, sufficient adhesive strength can not be obtained if the surface of the polyolefin foam has not been activated by corona discharge or a similar treatment.

Since the surface improvement by corona discharge is a temporary improving treatment, the surface wettability decreases with the passing of time and sufficient adhesive strength may no longer be obtained two weeks after the surface treatment. It is difficult to give stable adhesion over a long period by corona discharge.

SUMMARY OF THE INVENTION

An object of the present invention is to provide an improved method for producing a polyolefin foam sheet in which heating temperature and time have wide permissible ranges and expansion ratio is increased. Another object of the present invention is to provide a method for producing a polyolefin foam sheet having excellent thermal resistance and surface wettability. A further object of the present invention is to provide a method for improving the thermal resistance of a polyolefin foam sheet. A still further object of the present invention is to provide a method for improving its surface wettability.

The inventors, after earnest studies for achieving the above objects, have found that either coating a foamable base sheet containing a polyolefin resin and an organic foaming agent with a resin varnish or previously mixing it into the base sheet before heating and foaming the base sheet results in wider permissible ranges of heating temperature and time and an increased expansion ratio, thereby enabling a polyolefin foam sheet having good appearance and physical properties to be stably produced even if the heating temperature and time are not so acculately controlled, and also enabling a polyolefin foam sheet with uniform thickness to be produced even if the thickness of base sheets is not so accurately adjusted. Furthermore, the inventors have found unexpectedly that the thus produced polyolefin foam sheet which contains the resin varnish in its surface or in its inside based on the above varnish treatment has high thermal resistance and excellent surface wettability which remains stable with time. The inventors have also found that, irrespective of containing a resin varnish or not, the thermal resistance and the surface wettability of the polyolefin foam sheet can be improved by later coating or impregnating it with a resin varnish. Particularly the thermal resistance and the surface wettability of the polyolefin foam sheet containing a resin varnish in its surface or in its inside based on the previous varnish treatment can be remarkably improved by later coating or impregnating the foam with a resin varnish after foaming.

According to the first aspect of this invention, there is provided a method for producing a polyolefin foam sheet comprising coating a foamable base sheet containing a polyolefin resin and a foaming agent decomposing and generating gas during heating with a resin varnish and then heating said foamable base sheet to foam it.

According to the second aspect of this invention, there is provided a method for producing a polyolefin foam sheet comprising incorporating a resin varnish into a foamable base sheet containing a polyolefin resin and a foaming agent decomposing and generating gas during heating and then heating said foamable base sheet incorporated with the varnish therein to foam it.

According to the third aspect of this invention, there is provided a method for improving the thermal resistance of a polyolefin foam sheet comprising coating or impregnating the polyolefin foam sheet with a resin varnish.

According to the fourth aspect of this invention, there is provided a method for improving the surface wettability of a polyolefin foam sheet by coating or impregnating the polyolefin foam sheet with a resin varnish.

According to the present invention, a polyolefin foam sheet having excellent thermal resistance, high surface wettability that is stable even with the passage of time and a high expansion ratio can be stably produced within wide permissible ranges of heating temperature and time by the simple method of either previously coating a foaming base sheet with a resin varnish or previously mixing it into the foaming base sheet.

Further, the thermal resistance and the surface wettability of a polyolefin foam sheet can be improved by coating or impregnating it with a resin varnish. We think the reason why the above effects can be achieved is that the improved thermal resistance resulting from the resin varnish prevents the air bubbles themselves of the foam from being broken by melting during and after foaming and that the surface of the foam sheet is activated by the resin varnish and as a result the surface wettability of the foam sheet is improved.

BRIEF DESCRIPTION OF THE DRAWING

The above and other objects, features, and advantages of the present invention will be better understood from the following description taken in conjunction with the accompanying drawing, in which.

DETAILED DESCRIPTION OF THE INVENTION

Figure 1:
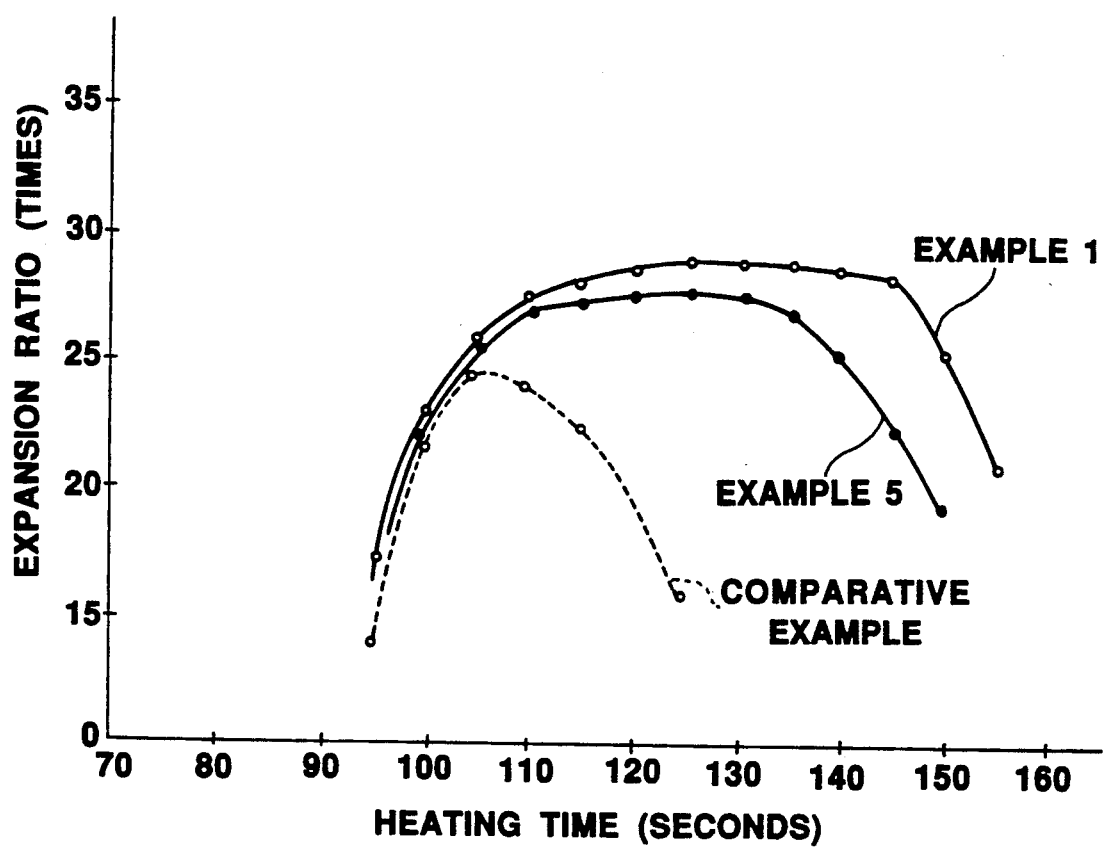
FIG. 1 shows the relationship between heating time and expansion ratio in the production of polyolefin foam sheets.

The polyolefin resins which can be used in this invention include polyethylenes, polypropylenes, ethylenevinyl acetate copolymers, ethylene propylene diene copolymers and their blends.

The foaming agents decomposing and generating gas during heating are solid at room temperature (25° C.) and have a decomposition temperature higher than the softening point of a polyolefin resin such as dinitrosopentamethylenetetr-amine, azodicarbonamide, 4,4'-hydroxybisbenzene-sulfonyl hydrazide, paratoluenesulfonyl hydrazide, para-toluenesulfonylacetone hydrazone and hydrazone carbon amide. The foaming agent is preferably used in an amount of 3 to 30 parts by weight, more preferably 5 to 25 parts by weight per 100 parts by weight of the polyolefin resins, although the amounts thereof are selected depending upon the density of a polyolefin foam sheet to be prepared.

For the resin varnish, any resins can be used such as rosin, cumaroune-indene resin, phenolic resins, alkyd resins, shellac resin and their modified products. The resins are solid at room temperature and used as solutions prepared by dissolving the resin into an organic solvent at a concentration of 0.5 to 2% by weight upon applying. The organic solvent should be capable of dissolving the resin and includes methylene chloride and mineral spirits.

For producing a polyolefin foam sheet according to the present invention, a foamable base sheet containing the above polyolefin resin and foaming agent is coated with a resin varnish, and then the foaming base sheet is heated to foam it. Although there is no restriction to the amount of the resin varnish, when a phenolic resin varnish is used, it is preferably that 1 to 50 g/m², preferably 5 to 20 g/m² as the solid resin component of the phenolic resin vanish may be used. An amount of a phenolic resin smaller than 1 g/m² may result in an insufficient coating effect of the phenolic resin. An amount of a phenolic resin larger than 50 g/m² may result in surface staining of the resulting foam sheet due to the discoloration of the phenolic resin itself thereby resulting in an inferior appearance of the foam sheet. As to the amounts of other resin varnishes used to coat the foaming base sheet, it is preferable that, as a solid component, 1 to 25 g/m², more preferably 1 to 10 g/m² of rosin, 1 to 25 g/m², more preferably 1 to 10 g/m² of cumarone-indene resin, 1 to 30 g/m², more preferably 1 to 20 g/m² of alkyd resin and 1 to 30 g/m², more preferably 1 to 20 g/m² of shellac resin may be used.

Alternatively, the resin varnish can be incorporated into the foamable base sheet containing the above polyolefin resin and foaming agent, and the blend is heated in order to foam it. Although there is no restriction to the amount of the resin varnish, when a phenolic resin varnish is used, it is preferable that 0.05 to 10 parts by weight, more preferably 0.1 to 5 parts by weight as a solid component of a phenolic resin varnish may be used for 100 parts by weight of a polyolefin resin. If an amount of a phenolic resin is smaller than 0.05 parts by weight, it may result in an insufficient effect of the phenolic resin. If the amount of a phenolic resin is larger than 10 parts by weight, the mixture can not be well kneaded because of the plasticizing effect of the phenolic resin itself during the production of a foaming base sheet, which may result in inferior tensile strength of the resulting foam sheet and may result in an inferior surface state of the foam sheet due to reduced crosslinking efficiency. Moreover, the foam sheet may discolor due to oxidational coloring by the phenolic resin thereby resulting in an inferior appearance of the foam sheet. Because of the same reason as above, it is preferable that the amounts of other resin varnishes such as rosin, cumarone-indene resin, shellac resin, alkyd resin and their modified products may be 0.05 to 10 parts by weight, preferably 0.1 to 5 parts by weight as solid component for 100 parts by weight of a polyolefin resin.

In the present invention, the foamable base sheet may be crosslinked by the conventional methods before heating and foaming. The crosslinking methods include an electron beam radiation method and a chemical reaction method using a crosslinking agent such as di-tert-butyl peroxide blended into the foaming base sheet. The chemical reaction is carried out by heating the foam base sheet at 130° to 300° C., more preferably 140° to 260° C. for 1 to 20 minutes. The crosslinking conditions may vary depending upon the thickness of base sheet, the kind and amount of polyolefin resin and other factors, although the foaming base sheet may preferably be crosslinked so that the foam sheet has a gel fraction of 20 to 60% by weight.

In the production method of this invention, the foaming stability as well as the thermal resistance and surface wettability of the resulting foam sheet can be remarkably improved by further coating with a resin varnish a foamable base sheet containing a polyolefin resin, a foaming agent and a resin varnish and then heating the foamable base sheet to foam it.

In heating and foaming the foamable base sheet, although conditions for heating and foaming can be properly selected, the heating temperature may be preferably in the range of from 200° to 300° C., more preferably from 220° to 280° C. The heating time may be preferably in the range of from 0.5 to 4 minutes, more preferably from 1.5 to 2.5 minutes. Since not only the permissible ranges of heating temperature and time for producing a good foam sheet are wider but also an increased expansion ratio is achieved for the same amount of a foaming agent, a foam sheet having an intended expansion ratio can be obtained by using a smaller amount of a foaming agent than the conventionally required amount. Furthermore, it is also possible to improve production efficiency with a higher foaming rate by making the heating temperature higher than conventionally. In general, the expansion ratio may be in the range of 5 to 50 times of the thickness of base sheet. It should be noted that, according to the present invention, the expansion ratio can be increased as high as 1.15 times than the conventional expansion ratio.

In order to improve thermal resistance and surface wettability of a polyolefin foam sheet according to the present invention, the polyolefin foam sheet is coated or impregnated with a resin varnish.

In this case, the polyolefin foams include polyethylene foams, polypropylene foams, polyethylene-polypropylene blend foams and ethylene-vinyl acetate foams. It is desirable that the amount of the resin varnish used to coat or impregnate the polyolefin foam with it may be 0.5 to 50 g/m$^2$, preferably 2 to 20 g/m$^2$.

As described above, according to the method for producing a polyolefin foam sheet of this invention, since the permissible ranges of heating temperature and time during foaming for producing a good foam sheet can be markedly widened and the expansion ratio can be increased, a foam sheet having good appearance and physical properties and a high expansion ratio can stably be obtained with good stability even if the heating temperature or time is not so accurately controlled. Therefore, the quality of the product, production efficiency and workability can be greatly improved. According to the production method and the thermal resistance improvement method of this invention, a polyolefin foam sheet having excellent thermal resistance and a remarkably high dimensional stability at high temperatures can be produced. Furthermore, according to the production method and the surface wettability improvement method of this invention, a polyolein foam sheet having excellent surface wettability which does not decrease for a long period of time can be obtained. Therefore, the polyolefin foam sheet of this invention has good adhesion which makes it unnecessary to perform a surface improvement treatment such as corona discharge which was conventionally required as a previous treatment process in laminating an outer layer material such as a vinyl chloride resin sheet on the polyolefin foam.

EXAMPLE

Examples of the invention are given below by way of illustration and not by way of limitation.

Example 1

Foamable base sheets with 1 mm thickness consisting of 100 parts by weight of a polyolefin resin mixture composed of a polypropylene and a polyethylene in a weight ratio of 50:50 were prepared. The foamable base sheets would have a theoretical expansion ratio of 27 times. The sheets were crosslinked by electron beam irradiation, and then a 10% methylene chloride solution of a phenolic resin (Hitanol 1502P produced by Hitachi Chemical Co., Ltd.) was homogeneously coated to the surfaces of the crosslinked sheets in such a manner that they were coated with 4 g/m$^2$ in terms of a solid component (the phenolic resin) of the solution. After methylene chloride used as a solvent had completely been evaporated from the surfaces of the sheets, the foaming sheets were put in an oven heated to 250° C. and their expansion ratios were measured successively. As the result, the sheets began to foam after 90 seconds from the start of heating, and after 110 seconds from the start of heating, they were almost completely foamed and foam sheets having a expansion ratio of 27 times were obtained.

Some of the foam sheets were further allowed to stand in the oven at the same temperature. Although they maintained a stable form while having the maximum expansion ratio for about 35 seconds, from 40 seconds later, that is after 150 seconds from the start of heating, a decrease of the expansion ratio due to melting occurred from the insides of the foam sheets. The results are shown in FIG. 1.

Figure 2:
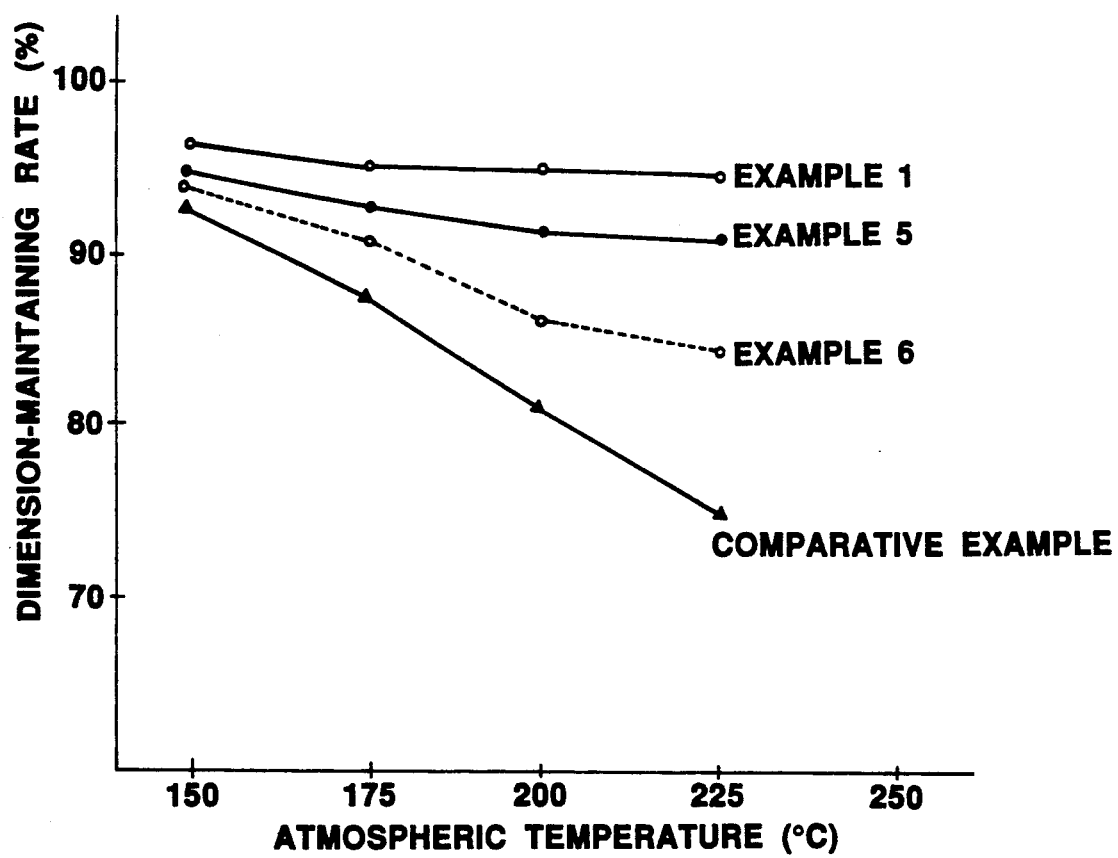
FIG. 2 shows dimension-maintaining rates as a function of atmospheric temperature when polyolefin foam sheets after their production were stored in ovens.

The other foam sheets having the maximum expansion ratio were taken out of the oven after 110 seconds from the start of heating and cooled to room temperature. Then, they were allowed to stand in ovens at 150° to 225° C. for three minutes and their dimensional changes due to thermal contraction were investigated. The results are shown in FIG. 2. From the results it was recognized that the dimensional change rate of the foam sheets is markedly small even when they have been allowed to stand at a high temperature of 225° C. and they display an excellent dimension-maintaining rate.

Example 2

Polyolefin foam sheets were produced by the same method as in Example 1 except that cumarone-indene resin (Cumarone NG produced by Mitsubishi Chemical Industries Limited) was used instead of the phenolic resin. As the result, the same effect as in Example 1 was observed.

Example 3

Polyolefin foam sheets were produced by the same method as in Example 1 except that rosin (Haritac AQ100B produced by Harima Chemical Co., Ltd.) was used instead of the phenolic resin. As the result, the same effect as in Example 1 was observed.

Example 4

Polyolefin foam sheets were produced by the same method as in Example 1 except that shellac resin (produced by Koyo Chemical Co., Ltd.) was used instead of the phenolic resin. As the result, the same effect as in Example 1 was observed.

Example 5

Foamable base sheets with 1 mm thickness consisting of 100 parts by weight of a polyolefin resin mixture composed of 50 parts by weight of a polypropylene and 50 parts by weight of a polyethylene and 1.5 parts by weight of the phenolic resin were prepared. The foamable base sheets would have a theoretical expansion ratio of 27 times. The sheets were crosslinked by electron beam irradiation, and then the sheets were put in an oven heated to 250° C. and their expansion ratios were measured successively. As the result, the sheets began to foam after 90 seconds from the start of heating. After 110 seconds from the start of heating, they were almost completely foamed and foam sheets having a expansion ratio of 27 times were obtained.

Some of the foams were further allowed to stand in the oven at the same temperature. They maintained a stable form while having the maximum expansion ratio for about 25 seconds. From 30 seconds later, that is after 140 seconds from the start of heating, a decrease of the expansion ratio due to melting occurred from the edges of the foam sheets. The results are shown in FIG. 1.

The other foam sheets having the maximum expansion ratio were taken out of the oven after 110 seconds from the start of heating and they were cooled to room temperature. They were allowed to stand in ovens at 150° to 225° C. for three minutes and their dimensional changes due to thermal contraction were investigated. The results are shown in FIG. 2. From the results, it was recognized that the dimensional change rate of the foam sheets is markedly small even when they have been allowed to stand at a high temperature of 225° C. and they display an excellent dimension-maintaining stability.

Example 6

Foamable base sheets with 1 mm thickness prepared in the same manner as in Example 1 were crosslinked by electron beam irradiation. The crosslinked sheets were foamed at 250° C. to produce foam sheets having the maximum expansion ratio and they were cooled to room temperature. Next, a 1% methylene chloride solution of the phenolic resin used in Example 1 was homogeneously applied to the surfaces of the foam sheets and methylene chloride used as a solvent was completely evaporated. The amount of the phenolic resin adhering to the surface was 0.5 g/m². In the same manner as in Example 1, the foam sheets having undergone surface treatment were allowed to stand in oven at 150° to 225° C. for three minutes and their dimensional changes were investigated. The results are shown in FIG. 2. From the result, it was recognized that the foam sheets display an excellent dimension-maintaining stability even when they have been allowed to stand at a high temperature of 225° C.

Comparative Example 1

Foamable base sheets with 1 mm thickness prepared in the same manner as in Example 1 were crosslinked by electron beam irradiation. The crosslinked sheets were put in an oven heated to 250° C. and their expansion ratios were measured successively. As the result, the sheets began to foam after 90 seconds from the start of heating, and the sheets were almost completely foamed after 105 seconds from the start of heating and foam sheets having a prescribed expansion ratio were obtained. However, after 110 seconds from the start of heating, the foam sheets began to melt from their edges and their expansion ratio began to decrease. After 120 seconds from the start of heating, melting severely proceeded so that the foam sheets got out of shape completely. The results are shown in FIG. 1.

Some of the foam sheets having the maximum expansion ratio were taken out of the oven after 105 seconds from the start of heating and cooled to room temperature. Thereafter, they were allowed to stand in ovens at 150° to 225° C. for three minutes and their dimensional changes due to thermal contraction were investigated. As the result, the dimensions of the foam sheets significantly decreased at temperatures of 200° C. or above and severe dimensional changes accompanied by melting were observed at 225° C.

The maximum expansion ratios, permissible time lengths of heating during foaming and dimensional stabilities at high temperature in the production of the polyolefin foams of Examples 1 to 6 and Comparative Example 1 are summarized in Table 1.

TABLE 1

| | Examples | | | | | | Comparative Example 1 |
| --- | --- | --- | --- | --- | --- | --- | --- |
| | 1 | 2 | 3 | 4 | 5 | 6 | |
| Resin varnish ingredient | Phenolic resin | Cumarone-indene resin | Rosin | Shellac resin | Phenolic resin | Phenolic resin | Non-treated |
| Treatment condition | 4 g/m² Adhesion to the foaming base sheet surface | | | | Kneaded into the foamable base sheet | Adhesion to the foam sheet surface | |
| Maximum expansion ratio (times) | 27.5 | 27.0 | 27.0 | 25.5 | 26.5 | — | 24.5 |
| Permissible heating time during foaming (seconds) | 35 | 33 | 28 | 20 | 25 | — | 5 |
| Dimensional stabilities at high temperatures | | | | | | | |
| 150° C. × 3 minutes Dimension-maintaining-rate (%) | 96 | 95 | 95 | 93 | 94 | 94 | 92 |
| 200° C. × 3 minutes | 95 | 93 | 94 | 89 | 91 | 86 | 80 |
| 225° C. × 3 minutes | 94 | 92 | 93 | 87 | 90 | 84 | 73 |
| Foam state after 225° C. × 3 minutes | Excellent | Excellent | Excellent | Good | Good | Good | Bad (Melt) |

From the results shown in Table 1 and FIGS. 1 and 2, it is seen that, when foamable base sheets which are coated with a resin varnish or into which it has been kneaded are foamed by heating, the permissible ranges of heating temperature and time required for good foaming over the entire width of the sheets are markedly widened as compared to those of the foam sheet obtained from non-treated foamable base sheets. According to the production method of this invention, the expansion ratio is also increased, the foaming stability is improved, and a good foam sheet with minimal foam density variation can be produced with high work efficiency. More detailedly, although usual non-treated foamable base sheets give only about 10 seconds of the permissible range of heating time for producing the maximum expansion ratio, foaming base sheets treated with a resin varnish give about 35 seconds of the permissible range of heating time and increased the expansion ratio.

In addition, it is also recognized that foam sheets produced from foaming base sheets coated with a resin varnish or containing it do not contract due to heat even when they are allowed to stand at a high temperature, exhibit an excellent dimensional stability and is highly heat resistant. The same thermal resistance can be obtained also by coating polyolefin sheets after foaming with a resin varnish.

Example 7

Foamable base sheets with 1 mm thickness consisting of 100 parts by weight of a polyolefin resin mixture composed of a polypropylene and a polyethylene in a weight ratio of 50:50 were prepared. The foamable base sheets would have a theoretical expansion ratio of 27 times. The sheets were crosslinked by electron beam irradiation, and then a 10% methylene chloride solution of a phenolic resin (Hitanol 1502P produced by Hitachi Chemical Co., Ltd.) was homogeneously applied to the surfaces of the cross-linked sheets in such a manner that they were coated with 5 g/m$^2$ in terms of a solid component (the phenolic resin) of the solution. After methylene chloride used as a solvent had completely evaporated from the surfaces of the sheets, the foamable sheets were put in an oven heated to 250° C. and were foamed to produce polyolefin foam sheets.

After the thus produced foam sheets were cooled to room temperature, their surface wettability indices were measured according to JIS. K-6768. As the result, they exhibited a high surface wettability index of 39 dyn/cm in an atmosphere of 23° C. and 50% RH.

Further, after the foam sheets were allowed to stand at room temperature for 30 days, their surface wettability indices were measured in the same manner as above. As the result, they still exhibited a high surface wettability index of 39 dyn/cm. The surface wettability index did not decrease with the passing of time.

Example 8

Polyolefin foam sheets were produced by the same method as in Example 7 except that cumarone-indene resin (Cumarone NG produced by Mitsubishi Chemical Industries Limited) was used instead of the phenolic resin. As the result, the same effect as in Example 7 was observed.

Example 9

Polyolefin foam sheets were produced by the same method as in Example 7 except that rosin (Haritac AQ100B produced by Harima Chemical Co., Ltd.) was used instead of the phenolic resin. As the result, the same effect as in Example 7 was observed.

Example 10

Polyolefin foam sheets were produced by the same method as in Example 7 except that shellac resin (produced by Koyo Chemical Co., Ltd.) was used instead of the phenolic resin. As the result, the same effect as in Example 7 was observed.

Example 11

Foamable base sheets with 1 mm thickness consisting of 100 parts by weight of a polyolefin resin mixture composed of 50 parts by weight of a polypropylene and 50 parts by weight of a polyethylene and also containing 1.0 parts by weight of a phenolic resin were prepared. The foamable base sheets would have a theoretical expansion ratio of 27 times. The sheets were crosslinked by electron beam irradiation, and then the sheets were put in an oven heated to 250° C. and were foamed to produce polyolefin foam sheets. As the result, the same effect as in Example 7 was observed.

Example 12

Foamable base sheets with 1 mm thickness prepared in the same manner as in Example 7 were cross-linked by electron ray irradiation. The sheets were foamed at 250° C. to produce foam sheets having the maximum expansion ratio, and they were cooled to room temperature. A 1% methylene chloride solution of the phenolic resin used in Example 7 was homogeneously applied to the surfaces of the foam sheets. Thereafter, methylene chloride used as a solvent was completely evaporated. The amount of the phenolic resin adhering to the surface was 2.0 g/m$^2$.

Example 13

Foamable base sheets with 1 mm thickness prepared in the same manner as in Example 11 were crosslinked by electron beam irradiation, and then a 10% methylene chloride solution of a phenolic resin (Hitanol 1502P produced by Hitachi Chemical Co., Ltd.) was homogeneously applied to the surfaces of the sheets in such a manner that they were coated with 5 g/m$^2$ as a solid component (the phenolic resin) of the solution. After methylene chloride used as a solvent had completely evaporated from the surfaces of the sheets, they were put in an oven heated to 250° C. and were formed to produce polyolefin foam sheets. As the result, the same effect as in Example 7 was observed.

Comparative Example 2

Foamable base sheets with 1 mm thickness prepared in the same manner as in Example 7 were cross-linked by electron beam irradiation. The sheets were put in an oven heated to 250° C. and were formed to produce foam sheets having the maximum expansion ratio. After the foam sheets were cooled to room temperature, their surface wettability indices were measured according to JIS K-6768. As the result, they exhibited a low surface wettability index of 31 dyn/cm in an atmosphere of 23° C. and 50% RH.

Comparative Example 3

The surfaces of the foam sheets of Comparative Example 2 were treated by corona discharge. As the result, the surface wettability index of the foam sheets increased from 31 dyn/cm to 43 dyn/cm, but 30 days later it decreased to 33 dyn/cm.

The surface wettability indices of the polyolefin foams of the above Examples 7 to 13 and Comparative Examples 2 and 3 on the day of production and after 30 days of their storage at room temperature are summarized in Table 2.

TABLE 2

| | Examples | | | | | | | Comparative Example 2 | Comparative Example 3 |
|---|---|---|---|---|---|---|---|---|---|
| | 7 | 8 | 9 | 10 | 11 | 12 | 13 | | |
| Resin varnish ingredient | Phenolic resin | Cumarone-indene resin | Rosin | Shellac resin | Phenolic resin | Phenolic resin | Phenolic resin | Non-treated | Corona discharge treatment |
| Treatment condition | 5 g/m² adhesion to the foaming base sheet surface | | | | Kneaded into the foamable base sheet | Adhesion to the foam sheet surface | Kneaded into the foamable base sheet + Adhesion to the foam sheet surface | | |
| Surface wettability index (dyn/cm) | | | | | | | | | |
| immediately after preparation | 39 | 38 | 40 | 40 | 41 | 41 | 44 | 31 | 43 |
| after 30 day storage | 39 | 39 | 39 | 39 | 41 | 41 | 44 | 31 | 33 |

From the results shown in Table 2, it is seen that all of the foam sheets produced from foaming base sheet coated with a resin varnish or containing it have excellent surface wettability reflected by surface wettability indices of 38 dyn/cm or above and show good adhesion and that this excellent surface wettability does not deteriorate with the passing of time. It is also seen that the same effect can be obtained by coating polyolefin sheets after foaming with a resin varnish. In contrast, the sheets of Comparative Example 2 in which no resin varnishes were used had unsatisfactory surface wettability reflected by a surface wettability index of 31 dyn/cm.

We claim:

1. The method for producing a polyolefin foam sheet comprising: heating a foamable base sheet, wherein said foamable base sheet comprises a polyolefin resin, a foaming agent, and a resin varnish, said foaming agent being capable of decomposing and generating gas during heating, and the resin of the varnish being selected from the group consisting of rosin, cumarone-indene resin, phenolic resin, alkyd resin, and shellac resin.

2. The method of claim 1 wherein said polyolefin resin is selected from the group consisting of polyethylenes, polypropylenes, ethylenevinyl acetate copolymers, ethylene propylene diene copolymers and their blends.

3. The method according to claim 2, wherein said polyolefin resin comprises a blend of polyethylenes and polypropylenes.

4. The method according to claim 3, wherein said resin varnish comprises phenolic resins.

5. The method of claim 1 wherein said foamable base sheet contains the resin varnish in an amount of 0.05 to 10 parts by weight as the solid resin component of the varnish for 100 parts by weight of the polyolefin resin.

* * * * *